US011859841B2

(12) United States Patent
Ota

(10) Patent No.: US 11,859,841 B2
(45) Date of Patent: Jan. 2, 2024

(54) AIR-CONDITIONING SYSTEM AND PROGRAM UPDATE METHOD OF AIR-CONDITIONING SYSTEM

(71) Applicant: Mitsubishi Electric Corporation, Tokyo (JP)

(72) Inventor: Tomohide Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 582 days.

(21) Appl. No.: 17/256,613

(22) PCT Filed: Aug. 28, 2018

(86) PCT No.: PCT/JP2018/031802
§ 371 (c)(1),
(2) Date: Dec. 28, 2020

(87) PCT Pub. No.: WO2020/044443
PCT Pub. Date: Mar. 5, 2020

(65) Prior Publication Data
US 2021/0262683 A1 Aug. 26, 2021

(51) Int. Cl.
*G06F 8/65* (2018.01)
*F24F 11/49* (2018.01)
(Continued)

(52) U.S. Cl.
CPC ............. *F24F 11/49* (2018.01); *F24F 11/54* (2018.01); *F24F 11/63* (2018.01); *G06F 8/65* (2013.01)

(58) Field of Classification Search
CPC ... G06F 8/65; G06F 13/00; F24F 11/49; F24F 11/63; F24F 11/54
(Continued)

(56) References Cited

U.S. PATENT DOCUMENTS

2003/0033392 A1 2/2003 Nakamura et al.
2004/0204793 A1 10/2004 Yoon et al.
2005/0144616 A1 6/2005 Hammond et al.

FOREIGN PATENT DOCUMENTS

JP 2003-056889 A 2/2003
JP 2004-198102 A 7/2004
(Continued)

OTHER PUBLICATIONS

International Search Report of the International Searching Authority dated Oct. 2, 2018 for the corresponding international application No. PCT/JP2018/031802 (and English translation).
Examination Report dated Mar. 31, 2022 issued in corresponding GB patent application No. 2100382.7.

*Primary Examiner* — John Q Chavis
(74) *Attorney, Agent, or Firm* — POSZ LAW GROUP, PLC

(57) ABSTRACT

An air-conditioning system includes equipment, the equipment including one or more pieces of equipment, a high level device connected to the equipment and configured to control the equipment, a first communication unit configured to obtain, from an update management device that previously stores an update program for updating a program of the equipment, the update program, a second communication unit configured to transmit the update program to the equipment and obtain a pre-update program from the equipment, a storage device configured to store the update program and the pre-update program, and an update execution unit configured to update the program of the equipment, in which the update execution unit transmits the update program to the equipment and updates the program of the equipment, and when one of the one or more pieces of the equipment in which the program is updated does not operate normally, the update execution unit transmits the pre-update program to the one of the one or more pieces of the (Continued)

equipment and restores the program of the one of the one or more pieces of the equipment to the pre-update program.

8 Claims, 9 Drawing Sheets

(51) Int. Cl.
    *F24F 11/63*     (2018.01)
    *F24F 11/54*     (2018.01)

(58) Field of Classification Search
    USPC ......................................................... 717/168
    See application file for complete search history.

(56) References Cited

FOREIGN PATENT DOCUMENTS

| | | | |
|---|---|---|---|
| JP | 2006-039813 A | 2/2006 | |
| JP | 2006-129283 A | 5/2006 | |
| JP | 2006-209469 A | 8/2006 | |
| JP | 2006-244164 A | 9/2006 | |
| JP | 2006-244269 A | 9/2006 | |
| JP | 2006309413 A * | 11/2006 | ............... G06F 8/62 |
| JP | 2007-510987 | 4/2007 | |
| JP | 2013-137149 A | 7/2013 | |
| JP | 2017-41180 A | 2/2017 | |
| KR | 10-2009-0065904 A | 6/2009 | |

* cited by examiner

|  | VERSION OF PRE-UPDATE PROGRAM | MODEL TYPE | UPDATE TIME (TRAFFIC) | SUCCESS OR FAILURE OF UPDATE |
|---|---|---|---|---|
| OUTDOOR UNIT 4A | X | 1 | 13:00 (INTERMEDIATE) | × |
| OUTDOOR UNIT 4B | X | 3 | 23:00 (LOW) | ○ |
| OUTDOOR UNIT 4C | Z | 2 | 10:00 (INTERMEDIATE) | ○ |
| OUTDOOR UNIT 4D | Y | 3 | 15:00 (HIGH) | ○ |
| OUTDOOR UNIT 4E | Z | 1 | 21:00 (LOW) | ○ |
| OUTDOOR UNIT 4F | Y | 1 | 16:00 (HIGH) | × |
| OUTDOOR UNIT 4G | Z | 2 | 11:00 (HIGH) | ○ |

AIR-CONDITIONING SYSTEM AND PROGRAM UPDATE METHOD OF AIR-CONDITIONING SYSTEM

CROSS REFERENCE TO RELATED APPLICATIONS

This application is a U.S. national stage application of International Application No. PCT/JP2018/031802 filed on Aug. 28, 2018, the contents of which are incorporated herein by reference.

TECHNICAL FIELD

The present disclosure relates to an air-conditioning system that updates a program, and a program update method of the air-conditioning system.

BACKGROUND ART

For an air-conditioning system including air-conditioning devices such as a plurality of outdoor units and indoor units and a management device configured to manage the air-conditioning devices, various methods for updating programs of the devices have been proposed. For example, Patent Literature 1 discloses a method of updating a management program in the management device configured to manage pieces of equipment such as the air-conditioning devices.

On the other hand, when the programs of the devices such as the air-conditioning devices are to be updated, an update operation is individually performed. In this case, an operator directly handles an installed device and rewrites an internally stored program. Specifically, the operator opens a cover such as a panel disposed in the device to access a terminal for program update, and connects a program update device or an auxiliary storage device to the terminal. Then, the operator uses an update program stored in the program update device or the auxiliary storage device to update the program internally stored in the device.

CITATION LIST

Patent Literature

Patent Literature 1: Japanese Unexamined Patent Application Publication No. 2006-39813

SUMMARY OF INVENTION

Technical Problem

However, the device such as the air-conditioning device is installed in a location where it is difficult for the operator to access such as an outdoor space, a space above a ceiling, or a pipe space in many cases. For this reason, depending on the installment location of the device, there is a risk that the operator may suffer physical burdens. In addition, when the program update is not successful, there is a possibility that a failure may occur that the device such as the air-conditioning device does not operate normally. When the failure occurs, the operator needs to work again to make the device operate normally, and this work is time consuming.

In view of the above-described problem, the present disclosure has been made aiming at providing an air-conditioning system that can reduce physical burdens on an operator and also eliminate a failure that equipment does not operate normally when program update fails, and a program update method of the air-conditioning system.

Solution to Problem

An air-conditioning system according to one embodiment of the present disclosure includes one or more pieces of equipment involved in air-conditioning, a high level device connected to the one or more pieces of equipment and configured to control the one or more pieces of equipment, a first communication unit configured to communicate with an update management device that previously stores an update program for updating a program of the one or more pieces of equipment and obtain the update program, a second communication unit configured to communicate with the one or more pieces of equipment, transmit the obtained update program to the one or more pieces of equipment, and obtain a pre-update program from the one or more pieces of equipment, a storage device configured to store the obtained update program and the obtained pre-update program, and an update execution unit configured to update the program of the one or more pieces of equipment, in which the update execution unit transmits the update program stored in the storage device to the one or more pieces of equipment and updates the program of the one or more pieces of equipment, and when one of the one or more pieces of equipment in which the program is updated does not operate normally, the update execution unit transmits the pre-update program stored in the storage device to the one of the one or more pieces of equipment and restores the program of the one of the one or more pieces of equipment to the pre-update program.

In addition, a program update method of an air-conditioning system according to one embodiment of the present disclosure is a program update method of an air-conditioning system for updating a program of one or more pieces of equipment involved in air-conditioning, the program update method including a step of obtaining an update program for updating the program of the one or more pieces of equipment from an update management device that previously stores the update program, a step of obtaining a pre-update program from the one or more pieces of equipment, a step of transmitting the obtained update program to the one or more pieces of equipment and updating the program of the one or more pieces of equipment, and a step of transmitting, when the one or more pieces of equipment in which the program is updated do not operate normally, the obtained pre-update program to the one or more pieces of equipment and restoring the program of the one or more pieces of equipment to the pre-update program.

Advantageous Effects of Invention

According to one embodiment of the present disclosure, the update processing device transmits the update program obtained from the update management device to the one or more pieces of equipment to update the program of one or more pieces of the equipment. In addition, when the one or more pieces of equipment in which the program is updated do not operate normally, the update processing device uses the pre-update program stored in the storage device and restores the program of the one or more pieces of equipment to the pre-update program. With this configuration, since it is not necessary for the operator to perform the update operation of the program by directly accessing the one or more pieces of equipment, the physical burdens imposed on the operator can be reduced, and also the failure in which the one or more pieces of equipment do not operate normally when the program update fails can be eliminated.

DESCRIPTION OF EMBODIMENTS

Embodiment 1

Hereinafter, an air-conditioning system according to Embodiment 1 of the present disclosure will be described. The air-conditioning system according to present Embodiment 1 includes one or more indoor units as one or more pieces of equipment involved in air-conditioning, and an outdoor unit as a high level device connected to the one or more indoor units configured to control the one or more indoor units,

[Configuration of Air-Conditioning System 100]

Figure 1:
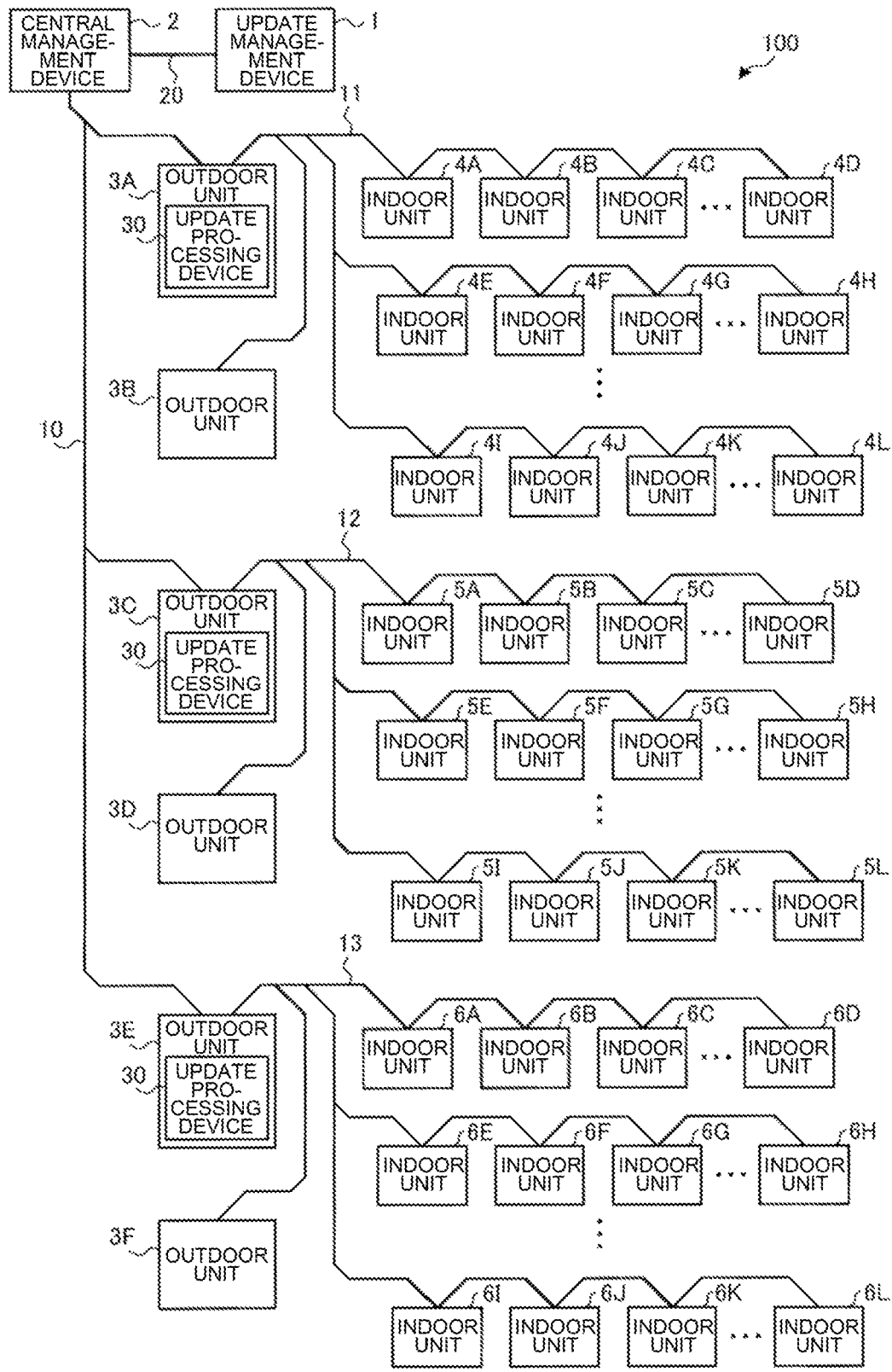
FIG. 1 is a block diagram illustrating an example of a configuration of an air-conditioning system according to Embodiment 1.

FIG. 1 is a block diagram illustrating an example of a configuration of an air-conditioning system 100 according to present Embodiment 1. As illustrated in FIG. 1, the air-conditioning system 100 includes an update management device 1, a central management device 2, outdoor units 3A to 3F, and indoor units 4A to 4L, 5A to 5L, and 6A to 6L. It is noted that in the air-conditioning system 100, the number of the outdoor units 3A to 3F and the number of the indoor units 4A to 4L, 5A to 5L, and 6A to 6L are not limited to the numbers in this example, and any number of units may also be used.

The central management device 2 is connected to the outdoor units 3A to 3F by a communication cable 10. The outdoor unit 3A is connected to the indoor units 4A to 4L by a communication cable 11. The outdoor unit 3C is connected to the indoor units 5A to 5L by a communication cable 12. The outdoor unit 3E is connected to the indoor units 6A to 6L by a communication cable 13. The update management device 1 is to be connected to the central management device 2 by a communication cable 20 when a program of the pieces of equipment is updated. The communication cable 20 that connects the update management device 1 to the central management device 2 is detached once the program update is ended.

The update management device 1 previously stores update programs for updating the pieces of equipment disposed in the air-conditioning system 100. At the time of program update, the update management device 1 transmits the update programs to the outdoor units 3A to 3F via the central management device 2.

The central management device 2 transmits and receives various types of data to and from the outdoor units 3A to 3F via the communication cable 10 to manage and control the outdoor units 3A to 3F and the indoor units 4A to 4L, 5A to 5L, and 6A to 6L connected to these outdoor units 3A to 3F. For example, the central management device 2 receives information indicating states of the outdoor units 3A to 3F and the indoor units 4A to 4L, 5A to 5L, and 6A to 6L, and also transmits control signals for controlling these units via the communication cable 10.

The outdoor units 3A to 3F perform an air-conditioning operation in cooperation with the indoor units 4A to 4L, 5A to 5L, and GA to 6L based on the control signals received from the central management device 2 via the communication cable 10. In addition, when the air-conditioning operation is performed, the outdoor units 3A to 3F transmit, to the central management device 2 via the communication cable 10, signals including data needed for the central management device 2 to perform the control.

The indoor units 4A to 4L, 5A to 5L, and 6A to 6L are installed in air-conditioned spaces, and perform air-conditioning in the air-conditioned spaces based on control from the respective cooperating outdoor units 3A to 3F. The indoor units 4A to 4L, 5A to 5L, and 6A to 6L perform various operations such as a cooling operation and a heating operation while the components in their own devices are controlled based on the control signals from the outdoor units 3A to 3F to which the indoor units 4A to 4L, 5A to 5L, and GA to 6L are respectively connected.

(Update Processing Device 30)

Here, according to present Embodiment 1, the outdoor units 3A, 3C, and 3E include update processing devices 30. The update processing devices 30 are disposed to execute program update processing for updating programs of the indoor units 4A to 4L, 5A to 5L, and 6A to 6L connected to the outdoor units 3A, 3C, and 3E.

Figure 2:
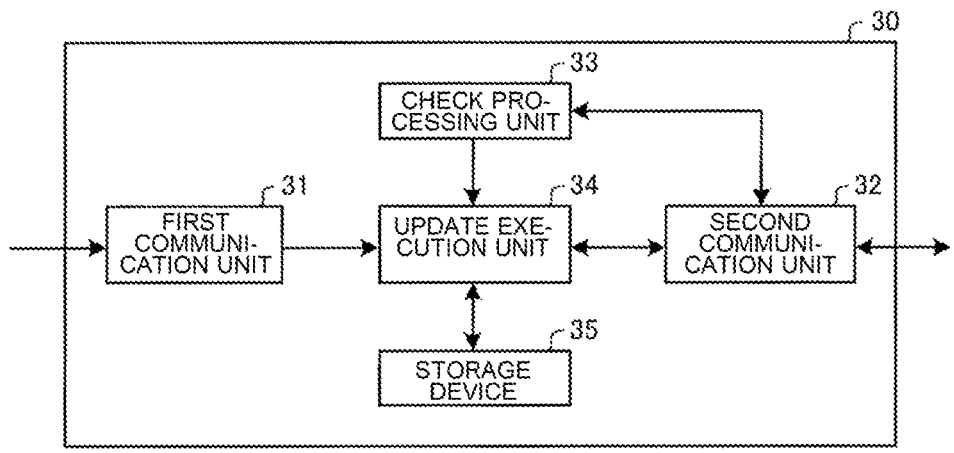
FIG. 2 is a block diagram illustrating an example of a configuration of an update processing device of FIG. 1.

FIG. 2 is a block diagram illustrating an example of a configuration of the update processing device 30 of FIG. 1. As illustrated in FIG. 2, the update processing device 30 includes a first communication unit 31, a second communication unit 32, a check processing unit 33, an update execution unit 34, and a storage device 35. Various functions of the update processing device 30 are realized by executing software on an arithmetic device such as a microcomputer, or the update processing device 30 is configured by hardware such as a circuit device that realizes the various functions.

The first communication unit 31 is an interface configured to communicate with the update management device 1 via the communication cable 10. The first communication unit 31 receives the update program from the update management device 1.

The second communication unit 32 is an interface configured to communicate with the indoor units 4A to 4L, 5A to 5L, and 6A to 6L via the communication cables 11 to 13. The second communication unit 32 receives programs before the update from the indoor units 4A to 4L, 5A to 5L, and 6A to 6L (hereinafter, referred to as "pre-update programs"), and setting information data indicating information related to settings. In addition, the second communication unit 32 transmits control signal update programs and various types of data such as the setting information data to the indoor units 4A to 4L, 5A to 5L, and 6A to 6L. The setting information data is, for example, data including setting information at the time of the operation, such as validation or invalidation of a power saving function.

The check processing unit 33 checks operation states and update states of the indoor units 4A to 4L, 5A to 5L, and 6A to 6L connected to the outdoor units 3A, 3C, and 3E. Specifically, when the programs of the indoor units 4A to 4L, 5A to 5L, and 6A to 6L are to be updated, the check processing unit 33 determines whether or not the programs of the respective units are updated, and determines the indoor units 4A to 4L, 5A to 5L, or 6A to 6L to be updated. In addition, when the programs of the indoor units 4A to 4L, 5A to 5L, and 6A to 6L are updated, the check processing unit 33 checks the respective operation states of the indoor units 4A to 4L, 5A to 5L, and 6A to 6L, and determines whether or not the respective units operate normally.

The update execution unit 34 performs the program update processing on the indoor units 4A to 4L, 5A to 5L, or 6A to 6L determined by the check processing unit 33. In addition, when the program is to be updated, the update execution unit 34 controls the operation of the indoor units 4A to 4L, 5A to 5L, or 6A to 6L set to be updated and stopping of the operation. Specifically, the update execution unit 34 reads out the update programs stored in the storage device 35 and the setting information data at the time of the program update. Then, the update execution unit 34 transmits the read-out update programs and setting information data to the indoor units 4A to 4L, 5A to 5L, or 6A to 6L in which the program is to be updated, via the second communication unit 32.

The storage device 35 is configured, for example, by a non-volatile memory, and stores various pieces of information used when the programs of the indoor units 4A to 4L, 5A to 5L, and 6A to 6L are updated. Specifically, the storage device 35 temporarily stores the update programs received via the first communication unit 31. In addition, the storage device 35 temporarily stores the pre-update programs and the setting information data on the indoor units 4A to 4L, 5A to 5L, and 6A to 6L that are received via the second communication unit 32.

Figure 3:
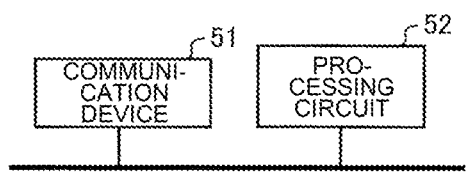
FIG. 3 is a hardware configuration diagram illustrating an example of a configuration of the update processing device of FIG. 2.

FIG. 3 is a hardware configuration diagram illustrating an example of a configuration of the update processing device 30 of FIG. 2. When various functions of the update processing device 30 are executed by hardware, the update processing device 30 of FIG. 2 is configured by a communication device 51 and a processing circuit 52 as illustrated in FIG. 3. The first communication unit 31 and the second communication unit 32 of FIG. 2 correspond to the communication device 51 of FIG. 3. In addition, respective functions of the check processing unit 33, the update execution unit 34, and the storage device 35 are realized by the processing circuit 52.

When the respective functions are executed by hardware, the processing circuit 52 corresponds, for example, to a single circuit, a combined circuit, a programmed processor, a parallel programmed processor, an application specific integrated circuit (ASIC), a field-programmable gate array (FPGA), or a combination of these. Each of the functions of the respective units of the check processing unit 33, the update execution unit 34, and the storage device 35 may also be realized by the processing circuit 52, and the functions of the respective units may also be realized by the processing circuit 52.

Figure 4:
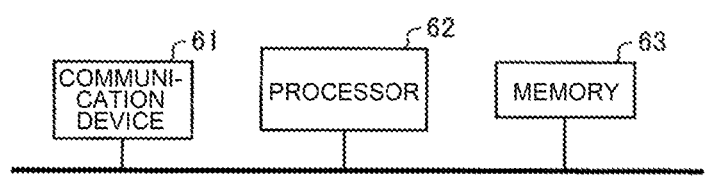
FIG. 4 is a hardware configuration diagram illustrating another example of the configuration of the update processing device of FIG. 2.

FIG. 4 is a hardware configuration diagram illustrating another example of the configuration of the update processing device 30 of FIG. 2. When the various functions of the update processing device 30 are executed by software, as illustrated in FIG. 4, the update processing device 30 of FIG. 2 is configured by a communication device 61, a processor 62, and a memory 63. The first communication unit 31 and the second communication unit 32 of FIG. 2 correspond to the communication device 61 of FIG. 4. In addition, the respective functions of the check processing unit 33, the update execution unit 34, and the storage device 35 are realized by the processor 62 and the memory 63.

When the respective functions are executed by software, the functions of the check processing unit 33 and the update execution unit 34 are realized by software, firmware, or a combination of software and firmware. The software and the firmware are written as a program and stored in the memory 63. The processor 62 reads out and executes the program stored in the memory 63 to realize the function of each unit.

As the memory 63, for example, a non-volatile or volatile semiconductor memory such as a random access memory (RAM), a read only memory (ROM), a flash memory, an erasable and programmable ROM (EPROM), and an electrically erasable and programmable ROM (EEPROM), or other memories are used. In addition, as the memory 63, for example, a magnetic disc, a detachable recording medium such as a flexible disc, an optical disc, a compact disc (CD), a mini disc (MD), and a digital versatile disc (DVD) may also be used.

[Operation of the Air-Conditioning System 100]

An operation of the air-conditioning system 100 that has the above-described configuration will be described. According to present Embodiment 1, the program update processing for sequentially updating the programs is performed on all of the plurality of indoor units 4A to 4L, 5A to 5L, and 6A to 6L disposed in the air-conditioning system 100.

(Program Update Processing)

First, the update management device 1 notifies the outdoor units 3A, 3C, and 3E of starting of the program update. Each of the outdoor units 3A, 3C, and 3E that have received the notification obtains an update program from the update management device 1, and temporarily saves the update program in the storage device 35.

The outdoor unit 3A selects one of the indoor units 4A to 4L to be updated, and updates the program. The outdoor unit 3C selects one of the indoor units 5A to 5L to be updated, and updates the program. The outdoor unit 3E selects one of the indoor units 6A to 6L to be updated, and updates the program. It is noted that since the program update processing in each of the outdoor units 3A, 3C, and 3E is similarly performed, hereinafter, the outdoor unit 3A will be featured for providing the description.

When the indoor unit 4A corresponding to one of the indoor units 4A to 4L to be updated is selected, the outdoor unit 3A obtains, from the selected indoor unit 4A, the setting information data and the pre-update program. The outdoor unit 3A temporarily saves the obtained setting information data and pre-update program in the storage device 35.

Next, the outdoor unit 3A excludes the indoor unit 4A set to be updated from operational devices, and stops the operation of the indoor unit 4A. The indoor unit 4A obtains the update program from the outdoor unit 3A, and overwrites and saves the obtained update program in the non-volatile memory where the program is written. With this configuration, the program of the indoor unit 4A is updated.

After the program update is completed, the indoor unit 4A obtains the setting information data temporarily saved in the outdoor unit 3A from the outdoor unit 3A, and performs the setting again. Then, the indoor unit 4A restarts and resumes the operation.

Next, the outdoor unit 3A performs the program update processing on the indoor unit 4B set to be updated next by a procedure similar to the procedure of the processing on the indoor unit 4A. In this manner, the outdoor unit 3A sequentially executes the program update processing on all the devices to be updated.

Here, after the program is updated, there is a possibility that an indoor unit does not operate normally. In the above-mentioned case, the outdoor unit 3A performs processing for restoring the program of the indoor unit that does not operate normally to the pre-update program. Hereinafter, as an example, a case where the indoor unit 4B does not operate normally as a result of the program update will be described.

In a case where the indoor unit 4B does not operate normally as a result of the program update, the outdoor unit 3A excludes the indoor unit 4B set to be updated from the operational devices, and stops the operation of the indoor unit 4B. The indoor unit 43 obtains the pre-update program from the outdoor unit 3A, and overwrites and saves the obtained pre-update program in the non-volatile memory. With this configuration, the program of the indoor unit 4B is restored to the pre-update program.

After the program is restored to the pre-update program, the indoor unit 4B obtains the setting information data temporarily saved in the outdoor unit 3A from the outdoor unit 3A, and performs the setting again. Then, the indoor unit 4A restarts and resumes the operation.

In this manner, according to present Embodiment 1, the update programs stored in the update management device 1 are transmitted to the indoor units 4A to 4L, 5A to 5L, and 6A to 6L via the outdoor units 3A, 3C, and 3E. With this configuration, an operator can update the programs of the indoor units 4A to 4L, 5A to 5L, and 6A to 6L by simply operating the update management device 1. In other words, according to present Embodiment 1, the programs of the indoor units 4A to 4L, 5A to 5L, and 6A to 6L can be updated without causing physical burdens on the operator.

In addition, when the programs of the indoor units 4A to 4L, 5A to 5L, and 6A to 6L are updated, the update is sequentially performed one by one. For this reason, it is sufficient to stop the operation of only the indoor unit to be updated, and the operation of the entirety of the air-conditioning system 100 is not stopped.

Figure 5:
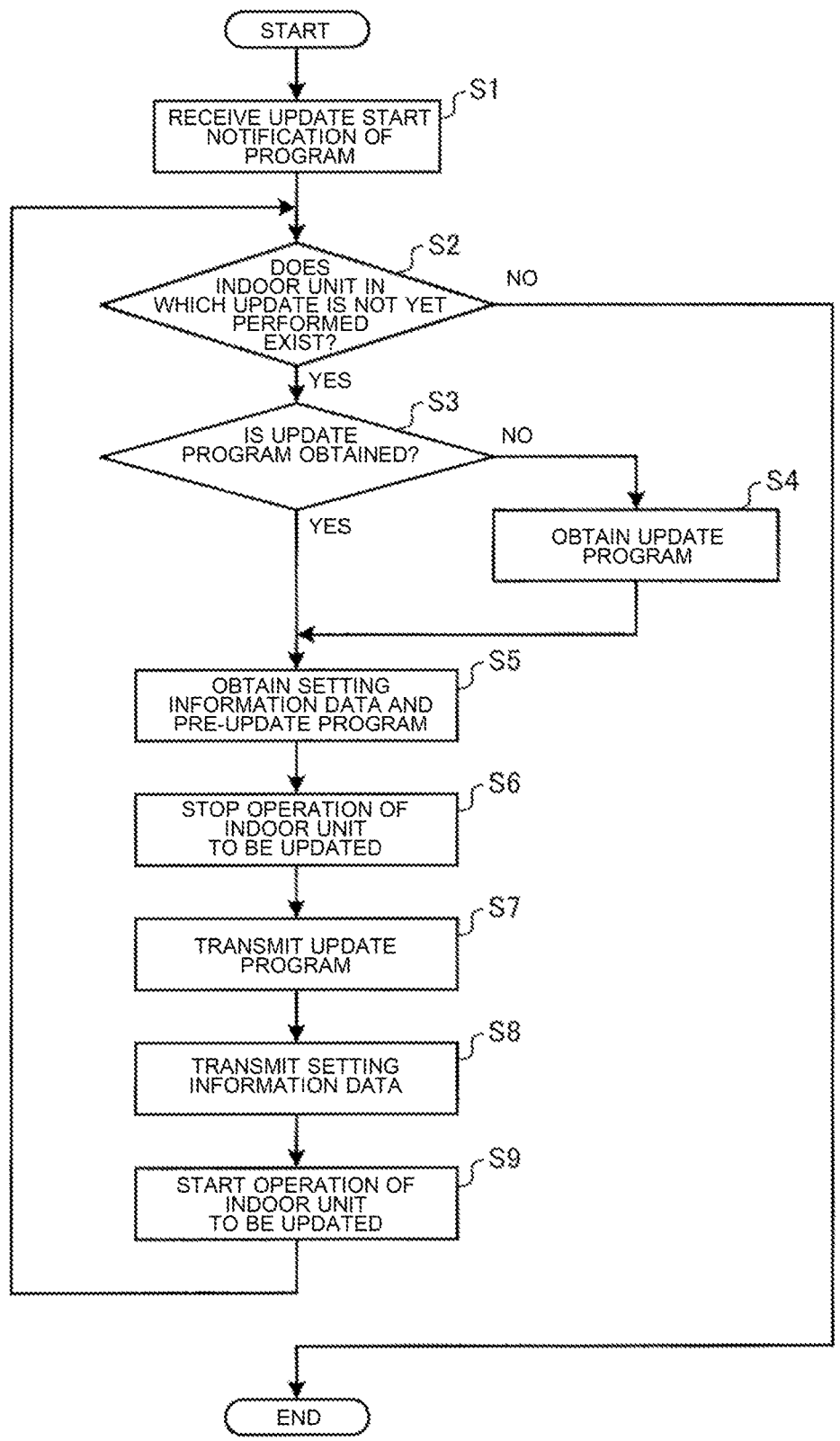
FIG. 5 is a flowchart illustrating an example of a flow of program update processing by an outdoor unit of FIG. 1.

FIG. 5 is a flowchart illustrating an example of a flow of the program update processing by the outdoor units 3A to 3E of FIG. 1. It is noted that hereinafter, a case will be described as an example where the outdoor unit 3A performs the program update processing.

In step S1, the first communication unit 31 of the outdoor unit 3A receives a notification for starting the program update that is transmitted from the update management device 1. In step S2, the check processing unit 33 determines whether or not an indoor unit in which the program is not updated exists among the indoor units 4A to 4L connected to its own device. When the indoor unit in which the program is not updated does not exist (step S2; No), the series of processes is ended. On the other hand, when the indoor unit in which the program is not updated exists (step S2; Yes), the processing shifts to step S3.

In step S3, the check processing unit 33 determines whether or not the update program is obtained from the update management device 1. When it is determined that the update program is obtained (step S3; Yes), the processing shifts to step S5. On the other hand, when it is determined that the update program is not obtained (step S3; No), in step S4, the first communication unit 31 obtains the update program from the update management device 1, and temporarily saves the update program in the storage device 35.

In step S5, the second communication unit 32 obtains the setting information data and the pre-update program from the indoor unit to be updated (for example, the indoor unit 4A), and temporarily saves the setting information data and the pre-update program in the storage device 35. In step S6, the update execution unit 34 stops the operation of the indoor unit 4A to be updated.

In step S1, the second communication unit 32 transmits the update program to the indoor unit 4A. With this configuration, in the indoor unit 4A, the update program is overwritten in the non-volatile memory, so that the program is updated. In step S8, the second communication unit 32 transmits the temporarily saved setting information data to the indoor unit 4A. With this configuration, in the indoor unit 4A, the setting is performed based on the setting information data. In step S9, the update execution unit 34 starts the operation of the indoor unit 4A.

Figure 6:
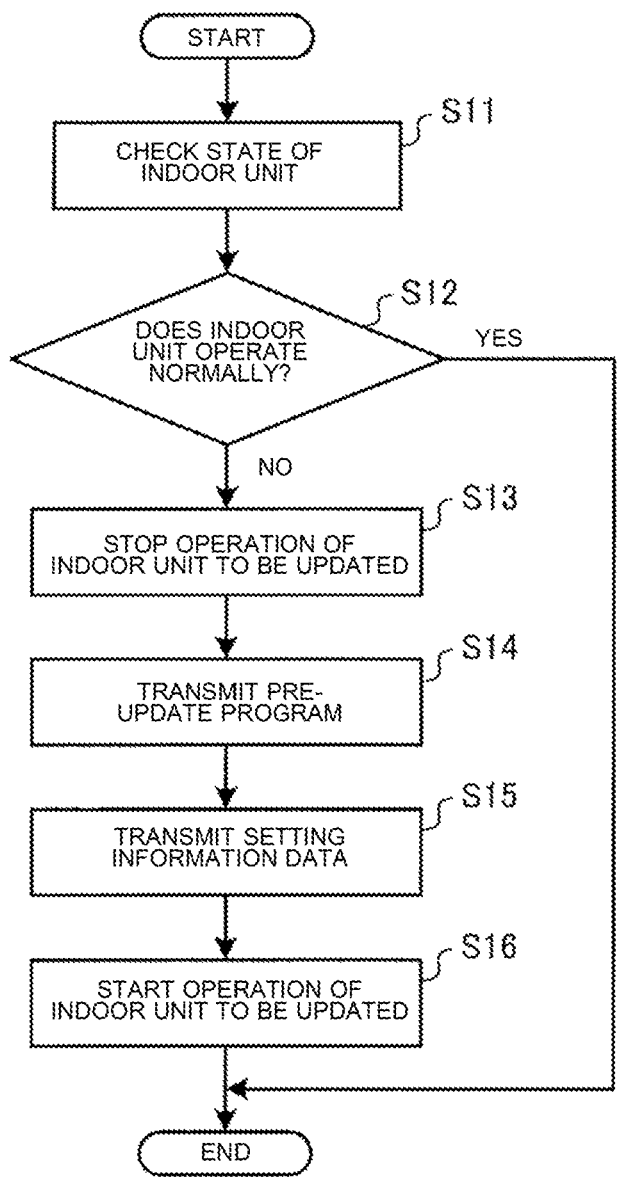
FIG. 6 is a flowchart illustrating a flow of an example of processing for restoring an updated program to a program before update.

Next, processing performed when one of the indoor units 4A to 4L in which the program is updated does not operate normally will be described. FIG. 6 is a flowchart illustrating a flow of an example of processing for restoring the updated program to the program before the update. It is noted that hereinafter, a case will be described as an example where the indoor unit 4B does not operate normally after the program is updated.

In step S11, the check processing unit 33 checks the operation states of the indoor units 4A to 4L in which the programs are updated. In step S12, the check processing unit 33 determines whether or not the indoor units 4A to 4L operate normally. When it is determined that the indoor units 4A to 4L operate normally (step S12; Yes), the series of processes is ended. On the other hand, when it is determined that even any one of the indoor units 4A to 4L does not operate normally (step S12; No), the processing shifts to step S13.

In step S13, the update execution unit 34 stops the operation of the indoor unit that does not operate normally (for example, the indoor unit 4B). In step S14, the second communication unit 32 transmits the pre-update program temporarily saved in the storage device 35 to the indoor unit 4B. With this configuration, in the indoor unit 4B, the pre-update program is overwritten in the non-volatile memory, so that the program is restored to the pre-update program. In step S15, the second communication unit 32 transmits the temporarily saved setting information data to the indoor unit 4B. With this configuration, in the indoor unit 4B, the setting is performed based on the setting information data. In step S16, the update execution unit 34 starts the operation of the indoor unit 4B.

It is noted that it is preferable to set whether to execute the program update or able to set an update time from a standpoint of comfort of a user. For example, in a case where an air-conditioner is installed in a hotel, it is considered that the user normally stays in a room in the morning and at night and does not stay in the daytime. For this reason, in this case, the program update is set to be executed in the daytime and not to be executed in the morning and at night. With this configuration, it is possible to avoid the execution of the program update when the user uses the air-conditioner.

As described above, in the air-conditioning system 100 according to present Embodiment 1, the update programs obtained from the update management device 1 are transmitted to the indoor units 4A to 4L, 5A to 5L, and 6A to 6L, and the programs of the indoor units 4A to 4L, 5A to 5L, and 6A to 6L are updated. With this configuration, since the operator does not need to directly access the indoor units 4A to 4L, 5A to 5L, and 6A to 6L to perform the program update operation, it is possible to reduce the physical burdens imposed on the operator.

In addition, when one of the indoor units 4A to 4L, 5A to 5L, and 6A to 6L in which the programs are updated does not operate normally, the pre-update program stored in the storage device 35 is transmitted to the one of the indoor units 4A to 4L, 5A to 5L, and 6A to 6L, and the program of the one of the indoor units 4A to 4L, 5A to 5L, and 6A to 6L is restored to the pre-update programs. With this configuration, an inoperative state is immediately restored to the state in which the indoor units 4A to 4L, 5A to 5L, and 6A to 6L operate normally. For this reason, it is possible to avoid the state in which the indoor units 4A to 4L, 5A to 5L, and 6A to 6L do not operate.

Embodiment 2

Next, Embodiment 2 of the present disclosure will be described. Embodiment 2 is different from Embodiment 1 in that the programs of only indoor units previously selected among the plurality of indoor units 4A to 4L, 5A to 5L, and 6A to 6L are updated. It is noted in the following description, parts common to the parts of Embodiment 1 are assigned with the same reference signs, and the detailed description thereof will be omitted.

[Configuration of the Air-Conditioning System 100]

Figure 7:
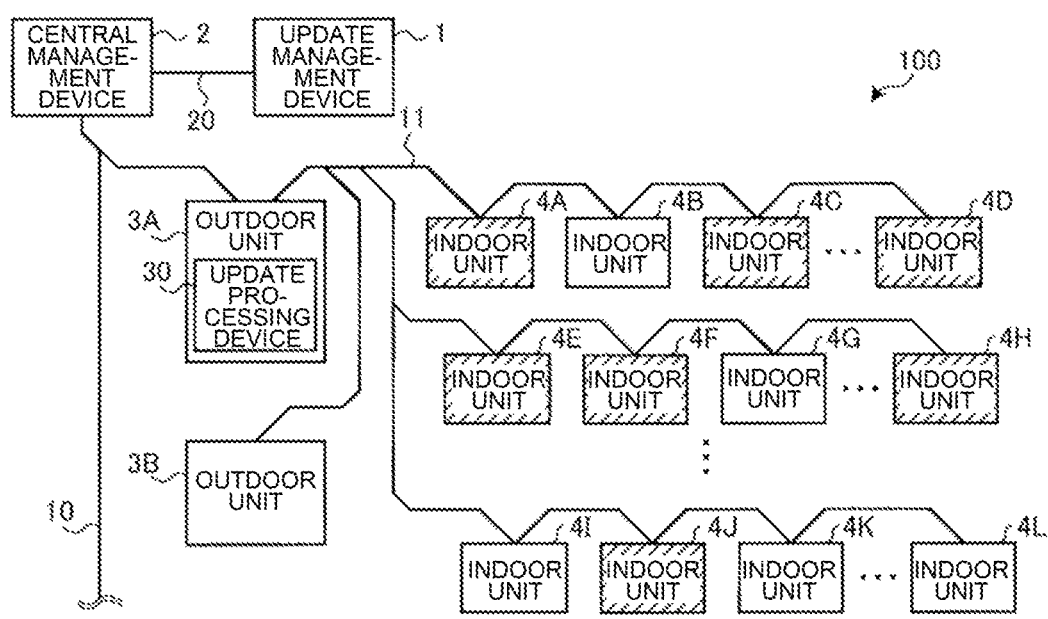
FIG. 7 is a block diagram illustrating an example of a configuration of an air-conditioning system according to Embodiment 2.

FIG. 7 is a block diagram illustrating an example of a configuration of the air-conditioning system 100 according to present Embodiment 2. The air-conditioning system 100 illustrated in FIG. 7 has a configuration similar to the air-conditioning system 100 according to Embodiment 1 illustrated in FIG. 1. In FIG. 7, the indoor units 4A, 4C to 4F, 4H, and 4J, which are illustrated as shaded blocks, correspond to indoor units in which the program is to be updated in present Embodiment 2. It is noted that, in this example, to avoid the complicated description, illustrations of the outdoor units 3C to 3F and the indoor units 5A to 5L and 6A to 6L are omitted.

The update management device 1 according to present Embodiment 2 previously stores update condition information in addition to the update programs. When the programs are to be updated, the update management device 1 transmits the update programs and the update condition information to the outdoor units 3A to 3F via the central management device 2. The update processing devices 30 of the outdoor units 3A to 3F temporarily store the update programs and the update condition information received from the update management device 1. The update condition information is information indicating an update condition of the program. Specifically, the update condition information includes information on the indoor unit in which the program is to be updated.

[Operation of the Air-Conditioning System 100]

The program update processing by the air-conditioning system 100 illustrated in FIG. 7 will be described. First, the update management device 1 notifies the outdoor unit 3A of starting of the program update. In response to the notification, the outdoor unit 3A obtains the update program from the update management device 1, and temporarily stores the update program in the storage device 35. In addition, the outdoor unit 3A obtains the update condition information from the update management device 1, and temporarily saves the update condition information in the storage device 35. It is noted that, as illustrated in FIG. 7, the update condition information is set to include information indicating that the programs of the indoor units 4A, 4C to 4F, 4H, and 4J are to be updated.

The outdoor unit 3A sequentially searches for and selects the indoor units 4A to 4L connected to its own device. Then, the outdoor unit 3A determines whether or not the selected indoor unit is to be updated based on the update condition information. As a result of the determination, when it is determined that the selected indoor unit is to be updated, the outdoor unit 3A updates the program for the selected indoor unit.

For example, when the indoor unit 4A corresponding to one of the indoor units 4A to 4L to be updated is selected, the outdoor unit 3A determines whether or not the selected indoor unit 4A is to be updated based on the update condition information. In this case, since the indoor unit 4A is to be updated, the outdoor unit 3A obtains the setting information data and the pre-update program from the indoor unit 4A. The outdoor unit 3A temporarily saves the obtained setting information data and pre-update program in the storage device 35.

Thereafter, the outdoor unit 3A updates the program of the indoor unit 4A as in Embodiment 1. After this, the outdoor unit 3A updates the programs of the indoor units 40 to 4F, 4H, and 4J to be updated included in the update condition information as in Embodiment 1. In this manner, according to present Embodiment 2, only the programs of the indoor units 4A, 4C to 4F, 4H, and 4J that are needed to be updated among the indoor units 4A to 4L are updated based on the update condition information stored in the update management device 1.

Figure 8:
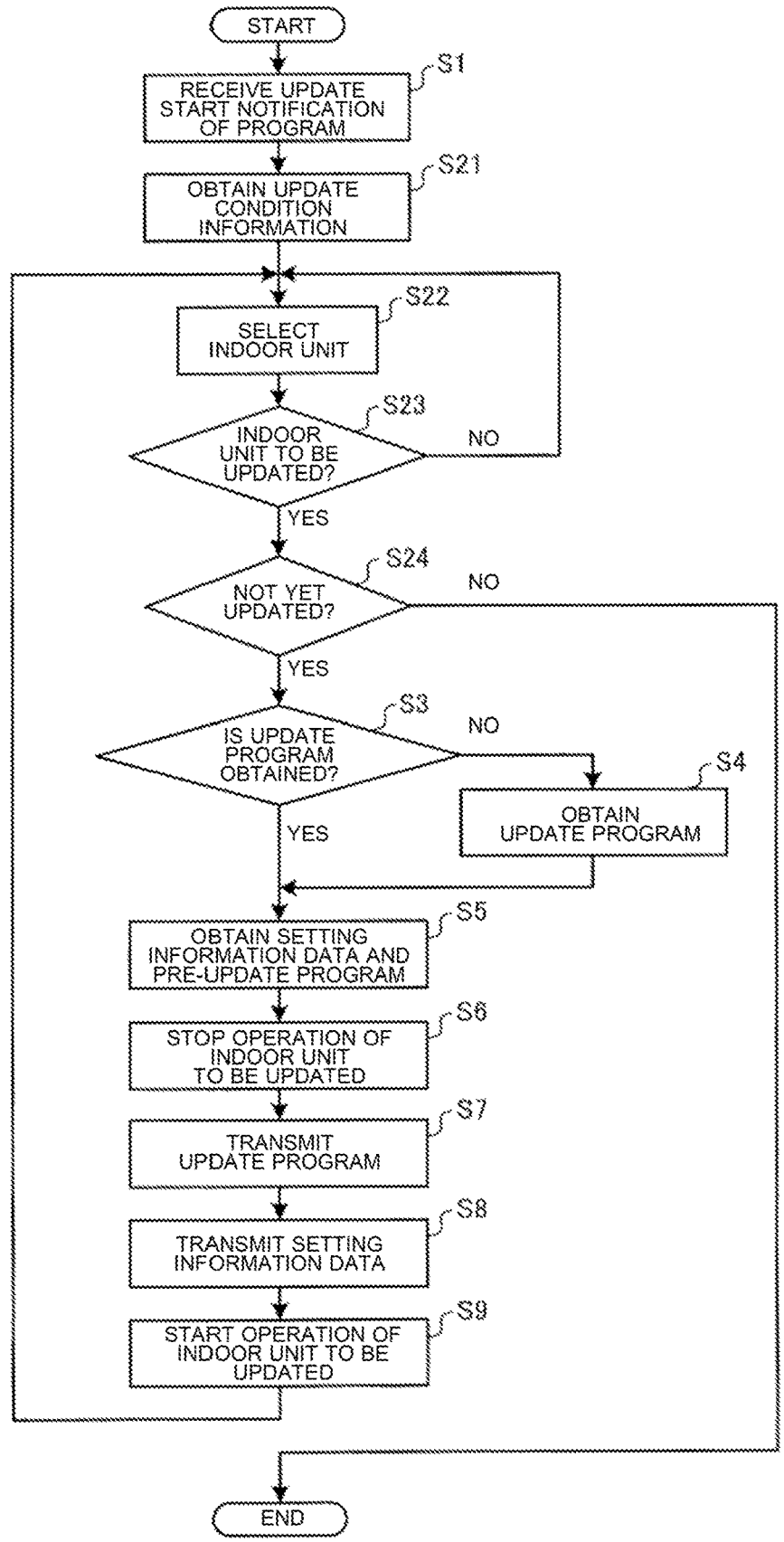
FIG. 8 is a flowchart illustrating an example of a flow of the program update processing by the outdoor unit of FIG. 7.

FIG. 8 is a flowchart illustrating an example of a flow of the program update processing by the outdoor unit 3A of FIG. 7. It is noted that in FIG. 8, the processing common to the processing in FIG. 5 is assigned with the same sign, and the detailed description will be omitted.

In step S1, the first communication unit 31 receives a notification for starting the program update that is transmitted from the update management device 1. In step S21, the first communication unit 31 receives the update condition information transmitted from the update management device 1. The received update condition information is temporarily saved in the storage device 35. In step S22, the check processing unit 33 selects one of the indoor units 4A to 4L connected to its own device.

In step S23, the check processing unit 33 determines whether or not the selected indoor unit is to be updated based on the update condition information. When the selected indoor unit is not to be updated (step S23; No), the processing returns to step S22, and the check processing unit 33 selects the next indoor unit. On the other hand, when the selected indoor unit is to be updated (step S23; Yes), the processing shifts to step S24.

In step S24, the check processing unit 33 determines whether or not the program of the selected indoor unit is not yet updated. When the program of the selected indoor unit is updated (step S24; No), the series of processes is ended. On the other hand, when the program of the selected indoor unit is not yet updated (step S24; Yes), the processing shifts to step S3.

Thereafter, as in Embodiment 1 illustrated in FIG. 5, the processing from steps S3 to S9 is performed, and the program is updated. Then, when the program of the indoor unit set to be updated is updated, the processing returns to step S22, and the program update processing on the next indoor unit is performed.

As described above, in the air-conditioning system 100 according to present Embodiment 2, the indoor units in which the program is to be updated are sequentially selected based on the update condition information stored in the update management device 1, and the program of the selected indoor unit is updated. With this configuration, since the programs of only the indoor units that need the update are updated, it is possible to efficiently perform the program update processing.

Embodiment 3

Next, Embodiment 3 of the present disclosure will be described. Present Embodiment 3 is different from Embodiments 1 and 2 in that groups are set for a plurality of indoor units, and when a program of an indoor unit in the set group is being updated, other indoor units in the same group operate to compensate for an air-conditioning capability of the indoor unit in which the update is being performed. It is noted in the following description, parts common to the parts according to Embodiments 1 and 2 are assigned with the same signs, and the detailed description will be omitted.

[Configuration of the Air-Conditioning System 100]

Figure 9:
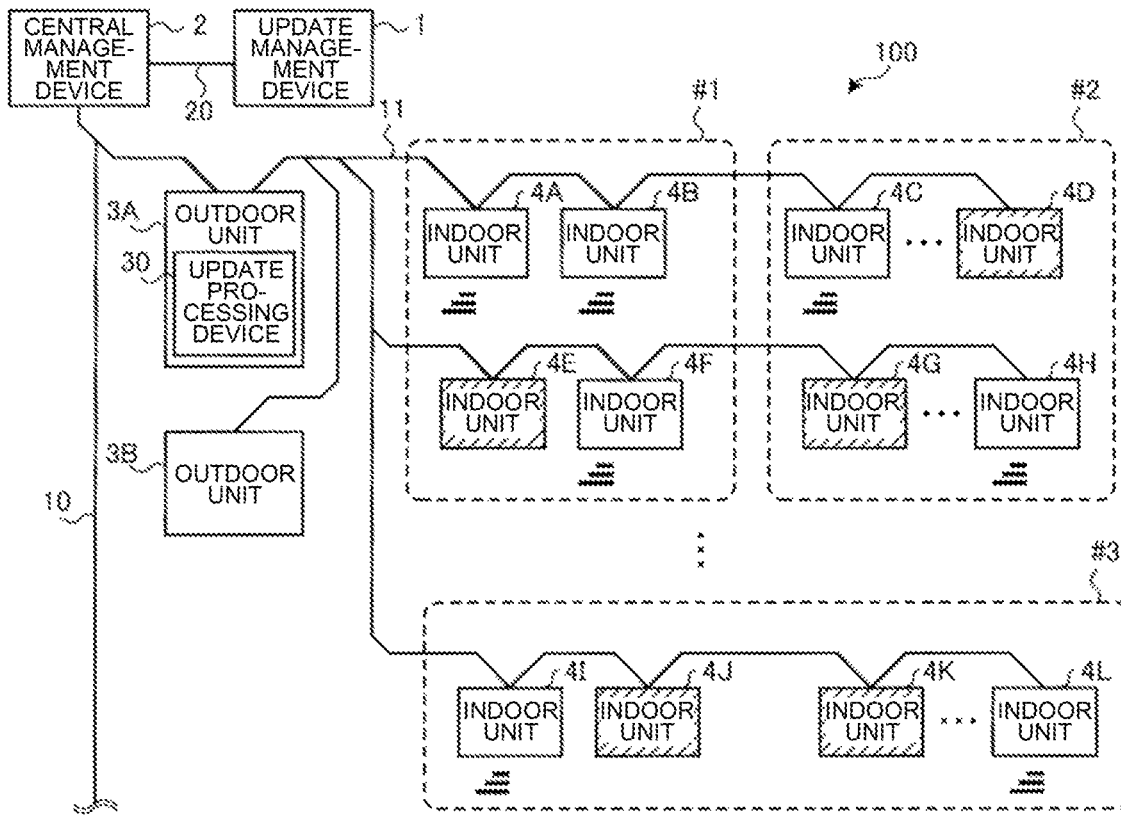
FIG. 9 is a block diagram illustrating an example of a configuration of an air-conditioning system according to Embodiment 3.

FIG. 9 is a block diagram illustrating an example of a configuration of the air-conditioning system 100 according to present Embodiment 3. The air-conditioning system 100 illustrated in FIG. 9 has a configuration similar to the air-conditioning system 100 according to Embodiments 1 and 2 illustrated in FIG. 1 and FIG. 7. In FIG. 9, the indoor units 4D, 4E, 4G, 4J, and 4K that are shaded for illustration correspond to the indoor units in which the programs are being updated according to present Embodiment 3. It is noted that in this example, to avoid the complicated description, illustrations of the outdoor units 3C to 3F and the indoor units 5A to 5L and 6A to 6L are omitted.

In the air-conditioning system 100 according to present Embodiment 3, a plurality of groups are set for the indoor units 4A to 4L. In the example illustrated in FIG. 9, three groups #1 to #3 are set for the indoor units 4A to 4L. The indoor units 4A, 4B, 4E, and 4F belong to the group #1. The indoor units 4C, 4D, 4G, and 4H belong to the group #2. The indoor units 4I to 4L belong to the group #3.

The groups for the indoor units 4A to 4L are set in units of management, for example. More specifically, the groups are set such that indoor units disposed to be adjacent to one another belong to the same group, such as a group for each set of indoor units in the same room or a group for each set of indoor units in the same section in a large room.

[Operation of the Air-Conditioning System 100]

In the air-conditioning system 100 according to present Embodiment 3, as in Embodiment 1 or 2, the program update processing on the indoor units 4A to 4L is performed.

Here, with the air-conditioning capability for each group taken into consideration, when a program of a part of the indoor units belonging to the group is being updated, since the operation of the indoor unit in the middle of update is stopped, the conditioning capability as a group decreases.

In view of the above, according to present Embodiment 3, when the program update of the part of the indoor units in the group is being performed, other indoor units are caused to operate such that the indoor units other than the indoor unit in the middle of update compensate for the decreased air-conditioning capability. Specifically, as illustrated in FIG. 9, in the group #1, when the program of the indoor unit 4E is being updated, the other indoor units 4A, 4B, and 4F belonging to the group #1 perform the operation for increasing the air-conditioning capability. In addition, in the group #2, when the programs of the indoor units 4D and 4G are being updated, the other indoor units 4C and 4H belonging to the group #2 perform the operation for increasing the air-conditioning capability. Furthermore, in the group #3, when the programs of the indoor units 4J and 4K are being updated, the other indoor units 4I and 4L belonging to the group #3 perform the operation for increasing the air-conditioning capability.

In this manner, according to present Embodiment 3, when the indoor unit where the operation is stopped in the middle of program update exists in the same group, the other indoor units in the relevant group operate to compensate for the decrease of the air-conditioning capability caused by the indoor unit in the middle of update. With this configuration, the air-conditioning capability in the group is maintained.

As described above, in the air-conditioning system 100 according to present Embodiment 3, when the program of the part of the indoor units in the group is being updated, the update processing device 30 causes the other indoor units in the group to operate to compensate for the air-conditioning capability of the relevant indoor unit. With this configuration, even when the indoor unit where the operation is stopped exists in the group, since the decrease of the air-conditioning capability caused by the stopping of the operation is compensated for by the other indoor units in the same group, it is possible to suppress the decrease of the air-conditioning capability in the group.

Embodiment 4

Next, Embodiment 4 of the present disclosure will be described. Present Embodiment 4 is different from Embodiments 1 to 3 in that the re-update of the program is attempted when the update of the program for the indoor unit fails. It is noted in the following description, the parts common to the parts according to Embodiments 1 to 3 are assigned with the same signs, and the detailed description will be omitted.

[Configuration of the Air-Conditioning System 100]

Figure 10:
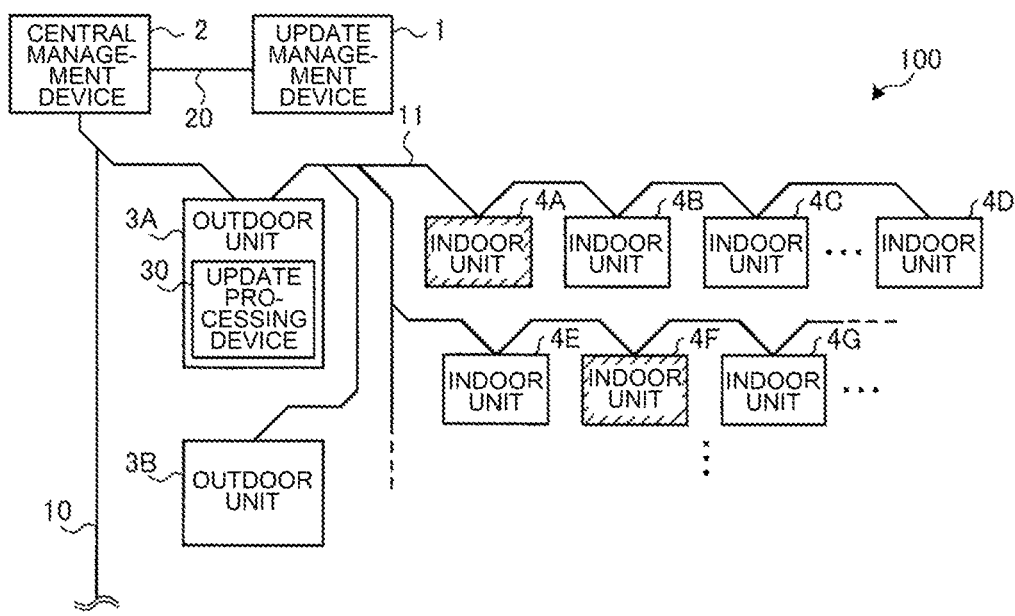
FIG. 10 is a block diagram illustrating an example of a configuration of an air-conditioning system according to Embodiment 4.

FIG. 10 is a block diagram illustrating an example of a configuration of the air-conditioning system 100 according to present Embodiment 4. The air-conditioning system 100 illustrated in FIG. 10 has a configuration similar to the air-conditioning system 100 according to Embodiments 1 to 3 illustrated in FIG. 1, FIG. 7, and FIG. 9. In FIG. 10, the indoor units 4A and 4F that are shaded for illustration correspond to indoor units in which the program update fails in present Embodiment 4. It is noted that in this example, to avoid the complicated description, illustrations of the indoor unit 4H, the outdoor units 3C to 3F, and the indoor units 5A to 5L and 6A to 6L are omitted.

Figures 11, 12:
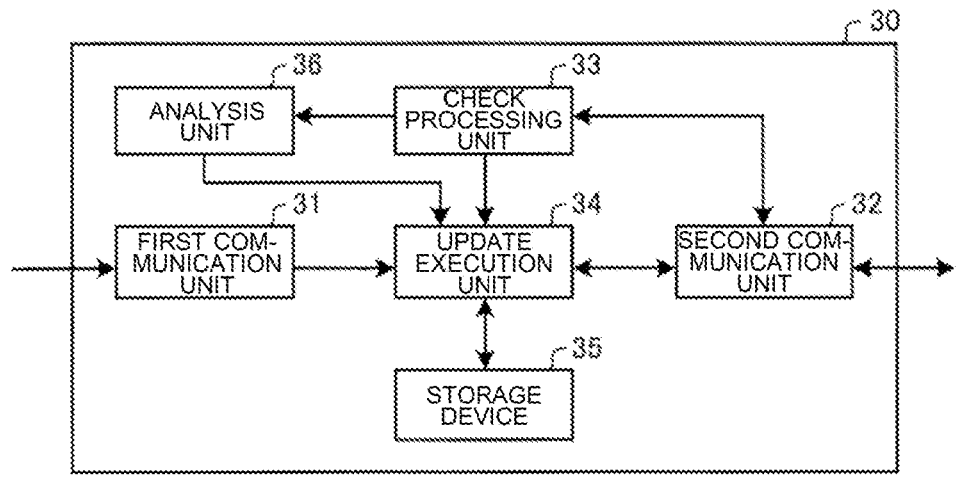
FIG. 11 is a block diagram illustrating an example of a configuration of an update processing device of FIG. 10.
FIG. 12 is a schematic diagram illustrating an example of device update data.

FIG. 11 is a block diagram illustrating an example of a configuration of the update processing device 30 of FIG. 10. As illustrated in FIG. 11, the update processing device 30 has the first communication unit 31, the second communication unit 32, the check processing unit 33, the update execution unit 34, the storage device 35, and an analysis unit 36. Various functions of the update processing device 30 are realized when software is executed on an arithmetic device such as a microcomputer, or the update processing device 30 is configured by hardware such as a circuit device that realizes the various functions.

As described according to Embodiment 1, the second communication unit 32 receives the pre-update program and the setting information data from the indoor units 4A to 4G, and also receives device update data. The device update data is data indicating a state of the indoor unit when the program of each of the indoor units 4A to 4G is updated and an update state. The check processing unit 33 checks success or failure of the program update in the indoor units 4A to 4G based on the device update data received by the second communication unit 32.

The analysis unit 36 analyzes a correlation relationship of various types of information based on various parameters included in the device update data and the success or failure of the program update. When it is determined that the correlation relationship exists based on the analysis result of the correlation relationship by the analysis unit 36, the update execution unit 34 performs processing for re-updating the programs of the indoor units 4A to 4G being subjects of the analysis. On the other hand, when it is determined that the correlation relationship does not exist or the program re-update fails, the update execution unit 34 performs the processing for restoring the programs of the indoor units 4A to 4G being the subjects of the analysis to the pre-update programs.

(Device Update Data)

FIG. 12 is a schematic diagram illustrating an example of the device update data. As illustrated in FIG. 12, the device update data includes a version of the pre-update program in each of the indoor units 4A to 4G, various parameters such as a model type of the indoor unit and an update time, and information indicating the success or failure of the program update. The version of the pre-update program is information indicating a version of the program before the program is updated. The model type is information indicating a model type of the relevant indoor unit. The update time is information indicating a time when the program update is executed. The update time may also include information indicating a transmission traffic at this time. The success or failure of the update is information indicating a result of the execution of the program update.

In the example illustrated in FIG. 12, for example, it is indicated with regard to the indoor unit 4A that the version of the pre-update program is "X", the model type is "#1", the update time is "13:00 (transmission traffic: intermediate)", and the program update fails. In addition, it is indicated with regard to the indoor unit 4B that the version of the pre-update program is "X", the model type is "#3", the update time is "23:00 (transmission traffic: low)", and the program update is successful.

[Operation of the Air-Conditioning System 100]

The operation of the air-conditioning system 100 that has the above-mentioned configuration will be described. According to present Embodiment 4, when the program update fails in any of the indoor units 4A to 4G, program re-update processing for attempting program re-update is performed.

(Program Re-Update Processing)

The program re-update processing is performed after the program update of all the indoor units 4A to 4G in which the program is to be updated. First, the update processing device 30 receives the device update data from each of the indoor units 4A to 4G in which the program is updated via the second communication unit 32. The second communication unit 32 supplies the received device update data to the check processing unit 33.

The check processing unit 33 determines whether or not the program update of all of the indoor units 4A to 4G is successful based on the received device update data. When any of all of the indoor units 4A to 4G in which the program update fails exists, the check processing unit 33 supplies the device update data to the analysis unit 36.

The analysis unit 36 extracts a correlation relationship between various parameters included in the received device update data and the information indicating the success or failure of the program update, and analyses the extracted correlation relationship of the various types of information. As a result of the analysis, when the correlation relationship exists in the various types of information, the update execution unit 34 performs the processing for re-updating the program on the indoor unit being subjects of the analysis. On the other hand, when the correlation relationship does not exist in the various types of information or the program update fails even after the re-update of the program is performed, as in Embodiment 1, the update execution unit 34 performs the processing for restoring the program to the pre-update program.

Here, with reference to FIG. 12, a specific example of the program re-update processing will be described. For example, when attention is paid to the indoor unit 4A and the indoor unit 4B, the version of the pre-update program is "X" in both the two indoor units. The program update is successful in the indoor unit 4B, but the program update fails in the indoor unit 4A. In view of the above, the update execution unit 34 of the update processing device 30 performs the program re-update processing on the indoor unit 4A to attempt the re-update of the program.

At this time, the indoor unit 4A and the indoor unit 4B have different update time when the program update processing is executed, and it is considered that there is a possibility that the transmission traffic at the time of the update affects the success or failure of the program update. Therefore, when the program re-update processing is performed on the indoor unit 4A, the update execution unit 34 performs the program re-update processing on the indoor unit 4A at a timing close to the update time when the program of the indoor unit 4B is updated or at a timing at which the transmission traffic is close to the transmission traffic when the program of the indoor unit 4B is updated.

It is noted that when the program update fails in this case too, it is considered that there is a possibility that the difference of the model types of the indoor units affects the success or failure of the program update. However, since the model type of the indoor unit cannot be changed, in this case, the update execution unit 34 suspends the program update.

Similarly, when attention also is paid to the indoor unit 4D and the indoor unit 4F, the version of the pre-update program is "Y" in both the two indoor units. The program update is successful in the indoor unit 4D, but the program update fails in the indoor unit 4F. It is noted that since the program update processing in the indoor unit 4D and the indoor unit 4F is performed at timings at which the transmission traffics are comparable to each other, it is conceivable that there is a possibility that the difference of the model types of the indoor units affects the success or failure of the program update. Therefore, also in this case, the update execution unit 34 suspends the program update.

Next, when attention is paid to the versions of the pre-update programs in all of the indoor units 4A to 4G, the program update is successful in all of the indoor unit 4C, the indoor unit 4E, and the indoor unit 4G in which the version of the pre-update program is "Z". From this, it is considered that there is a possibility that the program update may be successful by updating the program from the pre-update program in which the version is "Z". In view of the above, the update execution unit 34 performs processing on the indoor unit 4A and the indoor unit 4F where the program update fails for updating the program to the program in which the version is "Z" and then updating the program to the latest program.

It is noted that in this example, the information illustrated in FIG. 12 is used as the parameter affecting the success or failure of the program update, but the configuration is not limited to this example. For example, the program re-update processing may also be performed based on a commonality and a difference that are obtained from various types of information related to indoor units in which programs are updated using artificial intelligence.

In addition, the analysis result by the analysis unit 36 may also be stored, for example, in the storage device 35, and fed back to a creation source of the update program. In addition, when the program update processing performed on all of the indoor units 4A to 4G fails, the analysis result may also be fed back to the creation source of the update program, with a possibility of a bug of the update program in itself taken into account. With this configuration, the program creation source can study and create a subsequent renewed update program based on the information related to the update.

Figure 13:
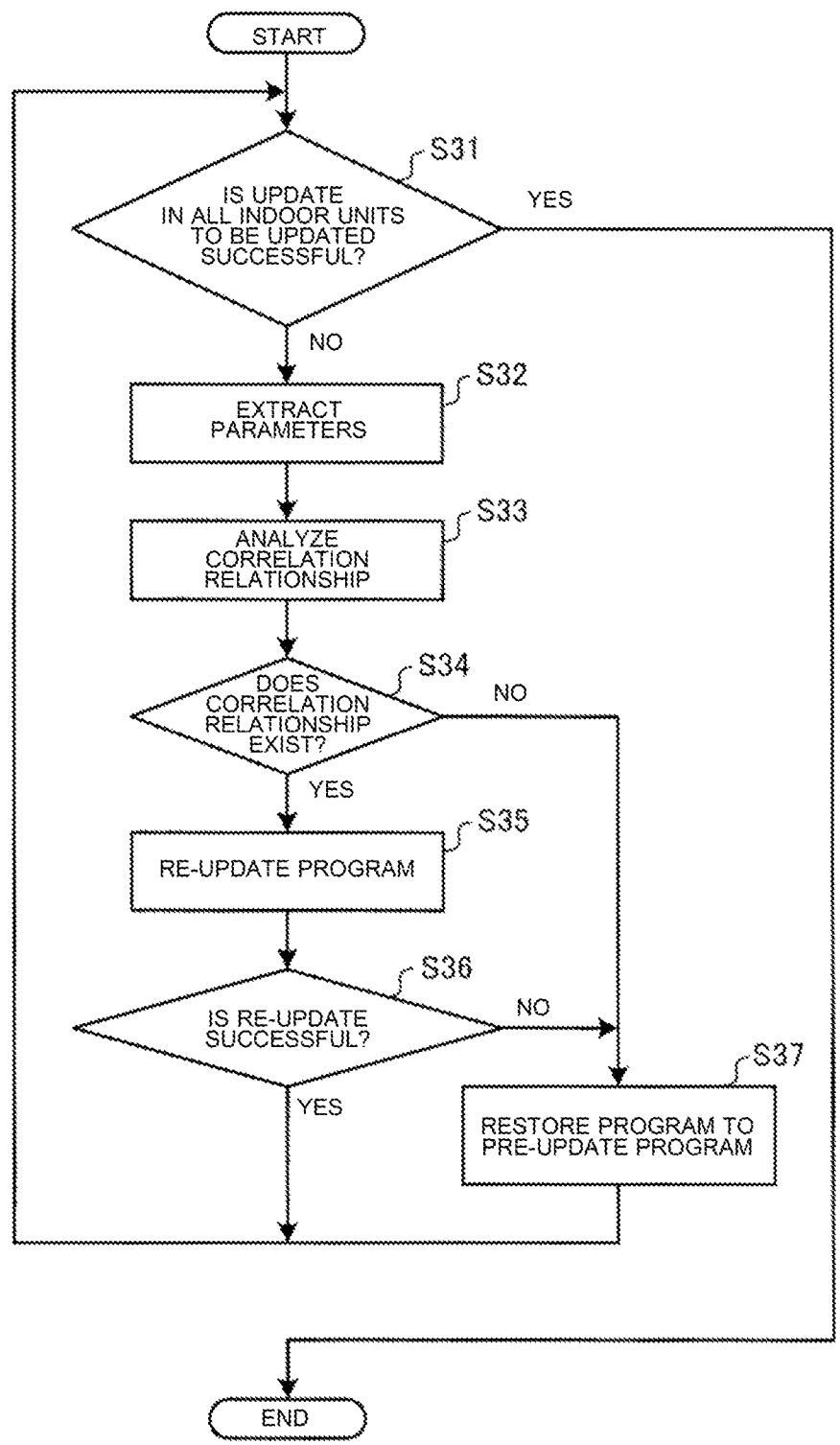
FIG. 13 is a flowchart illustrating an example of a flow of program re-update processing by the outdoor unit of FIG. 10.

FIG. 13 is a flowchart illustrating an example of a flow of the program re-update processing by the outdoor unit 3A of FIG. 10. In step S31, the check processing unit 33 determines whether or not the program update of all of the indoor units 4A to 4G is successful based on the device update data received from the respective indoor units 4A to 4G via the second communication unit 32. It is noted that here, also when the program of the indoor unit is restored to the pre-update program in step S37 that will be described below, this case is similarly treated as the success of the program update.

When it is determined that the program update of all of the indoor units 4A to 4G is successful (step S31; Yes), the series of processes is ended. On the other hand, when it is determined that the program update fails in any of the indoor units 4A to 4G (step S31; No), the processing shifts to step S32.

In step S32, the analysis unit 36 extracts various parameters affecting the success or failure of the program update from the device update data. Then, in step S33, the analysis unit 36 analyses the correlation relationship between the extracted various parameters and the information indicating the success or failure of the program update.

In step S34, the analysis unit 36 determines whether or not the correlation relationship between the various parameters and the success or failure of the update exists. When it is determined that the correlation relationship exists (step S34; Yes), the update execution unit 34 performs the processing for re-updating the program on the indoor unit being a subject of the determination, in step S35. On the other hand, when it is determined that the correlation relationship does not exist (step S34; No), the processing shifts to step S37.

In step S36, the update execution unit 34 determines whether or not the re-update of the program is successful. When it is determined that the re-update of the program is successful (step S36; Yes), the processing returns to step S31. On the other hand, when it is determined that the re-update of the program fails (step S36; N in step S37, the update execution unit 34 performs the processing for restoring the program of the relevant indoor unit to the pre-update program. Then, the processing returns to step S31.

As described above, according to present Embodiment 4, when the device update data on each indoor unit is analyzed after the program update and the correlation relationship exists in the parameters included in the relevant data, the program re-update processing is performed on the indoor unit in which the update fails. With this configuration, even when the program update fails due to any cause in the indoor unit where the program update could be performed under normal circumstances, the program of the relevant indoor unit can be more reliably updated than before.

Embodiments 1 to 4 of the present disclosure have been described above, but the present disclosure is not limited to above-described Embodiments 1 to 4 of the present disclosure, and various modifications and applications can be made in a range without departing from the gist of the present disclosure. According to Embodiments 1 to 4, the description has been made while the storage device 35 that temporarily saves the update program is disposed in each of the outdoor units 3A, 3C, and 3E serving as the high level devices, but the configuration is not limited to this example. For example, the update management device 1 or the central management device 2 may also be set as the high level device, and the storage device 35 may also be disposed in the update management device 1 or the central management device 2. With this configuration, the program update processing may also be executed on the outdoor units 3A to 3F.

In addition, according to Embodiments 1 to 4, the case has been described where the update management device 1 is connected to the central management device 2, but the configuration is not limited to this. For example, the central management device 2 may also have the functions of the update management device 1.

Furthermore, according to Embodiments 1 to 4, the case has been described where the outdoor units 3A to 3E are connected to the central management device 2, but the configuration is not limited to this. For example, it is also sufficient when the central management device 2 is not disposed. In this case, when the program is to be updated, the update management device 1 is connected to each of the outdoor units 3A, 3C, and 3E by the communication cable 20, and the update programs are directly exchanged between the update management device 1 and the outdoor units 3A, 3C, and 3E without the intermediation of the central management device 2.

Furthermore, the outdoor unit serving as the high level device including the update processing device 30 may also have the functions of the update management device 1. In this case, the update program or the update condition information previously stored in the update management device 1 is recorded in a recording medium that is detachable such as a universal serial bus (USB) memory. Then, when the program of the indoor unit is to be updated, the recording medium such as the USB memory is connected to the indoor unit, and the outdoor unit reads out the update program or the update condition information recorded in the recording medium.

It is noted that when the program update is performed using the recording medium as described above, the pre-update program received by the outdoor unit from the indoor unit may also be recorded, for example, in the recording medium. In addition, the update program or other data recorded in the recording medium may also be stored, for example, in the storage device 35 of the outdoor unit.

In addition, the devices in which the programs are updated are not limited to the indoor units 4A to 4L, 5A to 5L, and 6A to 6L, and may also include any devices as long as the devices are disposed in the air-conditioning system 100. For example, when a relay, a ventilating device, a remote controller, and other devices are disposed in the air-conditioning system 100, the program update processing may also be executed by setting these pieces of equipment to be updated.

REFERENCE SIGNS LIST 1 update management device 2 central management device 3A to 3F outdoor unit 4A to 4L, 5A to 5L, 6A to 6L indoor unit 10, 11, 12, 13, 20 communication cable 30 update processing device 31 first communication unit 32 second communication unit 33 check processing unit 34 update execution unit 35 storage device 36 analysis unit 51 communication device 52 processing circuit 61 communication device 62 processor 63 memory 100 air-conditioning system

The invention claimed is:

1. An air-conditioning system comprising:
equipment involved in air-conditioning, the equipment including one or a more pieces of equipment;
a high level device connected to the equipment and configured to control the equipment;
an update processing device positioned in the high level device and updates program of the equipment; and
a storage device configured to store an update program for updating the program of the equipment; wherein
the update processing device
communicates with an update management device that previously stores an update program and obtains the update program;
communicates with the equipment, transmits the obtained update program to the equipment, and obtains a pre-update program from the equipment;
stores the obtained update program and the obtained pre-update program in the storage device;
transmits the update program stored in the storage device to the equipment and updates the program of the equipment,
obtains, from the equipment in which the program is updated, device update data including parameters affecting success or failure of the update when the program is updated and an update result;
analyzes a correlation relationship of the parameters based on the device update data;
when one of the one or more pieces of the equipment in which the program is updated does not operate normally and the correlation relationship exists in the parameters related to the one of the one or more pieces of the equipment that does not operate normally, re-updates the program of the one of the one or more pieces of the equipment that does not operate normally, and when one of the one or more pieces of the equipment does not operate normally after the re-update of the program, transmits the pre-update program stored in the storage device to the one of the one or more pieces of the equipment and restores the program of the one of the one or more pieces of the equipment to the pre-update program.

2. The air-conditioning system of claim 1,
wherein the update processing device sequentially selects, based on update condition information that includes information on one or more pieces of the equipment in which the program is to be updated and is previously stored in the update management device, the one or more pieces of the equipment in which the programs are to be updated, and
transmits the update program to the equipment selected, and updates the program of the one or more pieces of the equipment in which the program is to be updated.

3. The air-conditioning system of claim 1, wherein the equipment belongs to one of a plurality of groups that are previously set, and
when the program of one or some pieces of the equipment in the group is being updated, the update processing device causes other pieces of equipment in the group to operate to compensate for an air-conditioning capability of the one or some pieces of the equipment in which the program is being updated.

4. The air-conditioning system of claim 1, wherein the high level device is an outdoor unit, and
the equipment is an indoor unit, a relay, a ventilating device, or a remote controller.

5. The air-conditioning system of claim 1, wherein the high level device is a central management device configured to manage and control the equipment, and
the equipment is an outdoor unit, an indoor unit, a relay, a ventilating device, or a remote controller.

6. An air-conditioning system comprising:
equipment involved in air-conditioning, the equipment including one or more pieces of equipment;
a high level device connected to the equipment and configured to control the equipment;
an update processing device positioned in the high level device and updates program of the equipment; and
a storage device configured to store an update program for updating the program of the equipment;
the update processing device
communicates with an update management device that previously stores an update program for updating a program of the equipment and obtain the update program;
communicates with the equipment, transmit the obtained update program to the equipment, and obtain a pre-update program from the equipment;
stores the obtained update program and the obtained pre-update program;
transmits the update program stored in the storage device to the equipment and updates the program of the equipment,
obtains, from the equipment in which the program is updated, device update program including parameters affecting success or failure of the update when the program is updated and an update result, a correlation relationship of the parameters;
analyzes a correlation relationship of the parameters based on the device update data, and
when one of the one or more pieces of the equipment in which the program is updated does not operate normally and the correlation relationship exists in the parameters related to the one of the one or more pieces of the equipment that does not operate normally, the update execution unit re-updates the program of the one of the one or more pieces of the equipment that does not operate normally.

7. A program update method for updating a program of equipment involved in air-conditioning, the equipment including one or more pieces of equipment, the program update method comprising:

obtaining, from an update management device that previously stores an update program for updating the program of the equipment, the update program;

obtaining a pre-update program from the equipment;

transmitting the obtained update program to the equipment and updating the program of the equipment; and obtaining, from the equipment in which the program is updated, program update data including parameters affecting success or failure of the update when the program is updated and an update result, a correlation relationship of the parameters;

analyzing a correlation relationship of the parameters;

when one of the one or more pieces of the equipment in which the program is updated does not operate normally and the correlation relationship exists in the parameters related to the one of the one or more pieces of the equipment that does not operate normally, re-updating the program of the one of the one or more pieces of the equipment that does not operate normally; and transmitting, when one of the one or more pieces of the equipment does not operate normally after the re-update of the program, the pre-update program to the one of the one or more pieces of the equipment and restoring the program of the one of the one or more pieces of the equipment to the pre-update program.

8. The air-conditioning system of claim 1, wherein the update execution unit re-updates the program by the parameters based on the analysis result obtained when it is analyzed that a correlation relationship exists in the parameters by the analysis unit.

* * * * *